(12) United States Patent
Franke et al.

(10) Patent No.: US 6,659,073 B1
(45) Date of Patent: Dec. 9, 2003

(54) METHOD FOR THE OPERATION OF A COMBUSTION ENGINE

(75) Inventors: Steffen Franke, Schwieberdingen (DE); Michael Baeuerle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 10/048,543

(22) PCT Filed: Jul. 13, 2000

(86) PCT No.: PCT/DE00/02288

§ 371 (c)(1),
(2), (4) Date: Feb. 25, 2002

(87) PCT Pub. No.: WO01/09500

PCT Pub. Date: Feb. 8, 2001

(30) Foreign Application Priority Data

Jul. 31, 1999 (DE) .................................... 199 36 201

(51) Int. Cl.⁷ ................................................. F02B 3/00
(52) U.S. Cl. ........................................ 123/299; 123/305
(58) Field of Search ................. 123/295, 299, 123/300, 305, 406.21, 406.29

(56) References Cited

U.S. PATENT DOCUMENTS

| 4,621,599 | A |   | 11/1986 | Igashira et al. |
| 5,163,405 | A |   | 11/1992 | Ahern et al. |
| 5,713,328 | A | * | 2/1998  | Anderson et al. ............ 123/299 |
| 5,755,198 | A | * | 5/1998  | Grob et al. .................. 123/295 |
| 6,041,755 | A | * | 3/2000  | Mashiki .................. 123/406.29 |
| 6,505,603 | B1 | * | 1/2003 | Schray et al. ................ 123/299 |

FOREIGN PATENT DOCUMENTS

| DE | 30 22 993 | 1/1982 |
| EP | 0 849 459 | 6/1998 |
| EP | 0 900 928 | 3/1999 |
| JP | 04 187851 | 10/1992 |

* cited by examiner

Primary Examiner—Mahmoud Gimie
(74) Attorney, Agent, or Firm—Walter Ottesen

(57) ABSTRACT

An internal combustion engine, especially for a motor vehicle, is described which is provided with a combustion chamber wherein fuel can be injected directly by an injection valve in a first operating mode during an induction phase, in a second operating mode during a compression phase or in a third operating mode during the induction phase and during the compression phase and can be ignited by a spark plug. In the third operating mode, the mass of the fuel, which is injected during the induction phase, is reduced (32) by the control apparatus.

12 Claims, 3 Drawing Sheets

METHOD FOR THE OPERATION OF A COMBUSTION ENGINE

FIELD OF THE INVENTION

The invention relates to a method for operating an internal combustion engine, especially of a motor vehicle, wherein fuel is injected directly into a combustion chamber in a first operating mode during an induction phase, in a second operating mode during a compression phase or in a third operating mode during the intake and compression phases and is ignited. Likewise, the invention relates to a corresponding control apparatus for an internal combustion engine, especially of a motor vehicle, as well as a corresponding engine, especially for a motor vehicle.

BACKGROUND OF THE INVENTION

A method, control apparatus and internal combustion engine of this kind are known, for example, in a so-called gasoline direct injection. There, the fuel is injected into the combustion chamber of the engine in a homogeneous operation during the induction phase or in a stratified operation during the compression phase. The homogeneous operation is preferably provided for the full-load operation of the engine; whereas, the stratified operation is suitable for the idle and part-load operation. In a direct-injecting engine of this kind, for example, there is a switchover between the above-mentioned operating modes in dependence upon the requested torque.

In a double injection, fuel is injected into the combustion chamber during the induction phase and during the compression phase. A reduction of the knock sensitivity of the engine can be achieved with this combination of the homogeneous operation and the stratified operation.

A further reduction of the knock sensitivity can be achieved by a retardation of the ignition angle for the ignition of the spark plug. This, however, causes a collapse of torque which is the same as a deterioration of the efficiency.

SUMMARY OF THE INVENTION

The task of the invention is to provide a method for operating an internal combustion engine with which the knock sensitivity of the engine can be further reduced without significantly reducing the efficiency thereof.

This task is solved according to the invention with a method of the type initially mentioned herein in that the mass of the fuel, which is injected during the induction phase, is reduced in the third operating mode when there is a knocking of the engine. The task is correspondingly solved with a control apparatus and an internal combustion engine of the respective types mentioned initially herein.

The air/fuel mixture injected in homogeneous operation becomes leaner because of the reduction of the fuel mass injected during the induction phase. A homogeneous operation, which becomes leaner in this manner, affords the advantage that the knock sensitivity of the engine becomes less. The engine is thereby less sensitive to knocking. It is therefore not necessary to retard the ignition angle in order to avoid knocking of the engine. In this way, no torque is destroyed so that also no reduction of efficiency is present.

In an advantageous embodiment of the invention, the mass of the fuel, which is injected during the compression phase, is increased in the same manner as the mass of the fuel, which is injected during the induction phase, is reduced. In this way, overall, the injected fuel mass is held essentially constant. The torque, which is generated by the engine, thereby remains essentially the same and the knock sensitivity of the engine is, however, reduced as already mentioned.

In an advantageous embodiment of the invention, fuel is injected directly by the injection valve into the combustion chamber in the third operating mode after the ignition via the spark plug. In total, a triple injection is carried out. In this way, the fuel, which is to be injected, can be better distributed over the different individual injections.

In an advantageous embodiment of the invention, the mass of the fuel, which is injected after the ignition, is increased in the same manner as the mass of the fuel, which is injected during the induction phase, is reduced. In this way, overall, the injected fuel mass is held essentially constant. The fuel mass, which is injected during the compression phase, does not have to be significantly changed.

It is especially advantageous when the mass of the fuel, which is injected during the compression phase, is held to a value which is less than a pregivable or applicable limit. In this way, the fuel mass, which is injected during the compression phase, can be held under that value which ensures a combustion below the soot limit. At the same time, a reduction of the fuel mass, which is injected during the induction phase, can however be compensated by an increase of the fuel mass which is injected after the ignition. In total, essentially the same fuel mass is injected into the combustion chamber. However, on the one hand, the knock sensitivity of the engine is reduced because of a reduction of the fuel mass which is injected during the induction phase without, however, exceeding the soot limit of the fuel mass injected during the compression phase.

Of special significance is the realization of the method of the invention in the form of a control element which is provided for a control apparatus of an engine, especially of a motor vehicle. A program is stored on the control element which is capable of being run on a computer, especially on a microprocessor, and is suitable for executing the method according to the invention. In this case, the invention is realized by a program stored on the control element so that this control element, which is provided with the program, defines the invention in the same way as the method which the program can carry out. Especially an electric storage medium can be used as a control element, for example, a read-only-memory or a flash memory.

Further features, application possibilities and advantages of the invention will become apparent from the following description of embodiments of the invention which are illustrated in the drawing. All described or illustrated features define the subject matter of the invention by themselves or in any desired combination independently of their summary in the patent claims or their dependency as well as independently of their formulation or presentation in the description and/or in the drawing.

DESCRIPTION OF THE PREFERRED EMBODIMENT OF THE INVENTION

Figure 1:
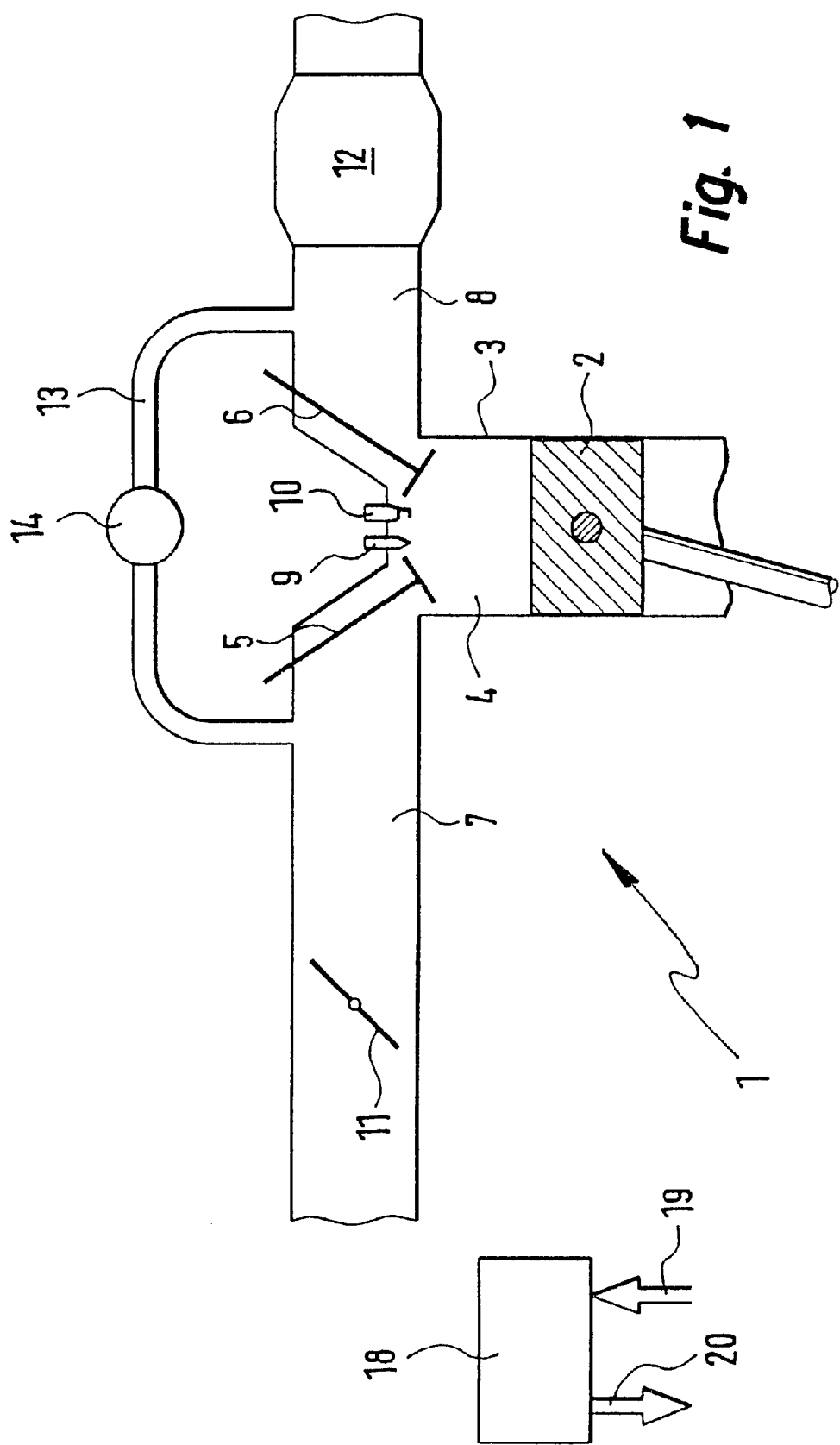
FIG. 1 shows a schematic illustration of an embodiment of an internal combustion engine according to the invention.

In FIG. 1, an internal combustion engine 1 of a motor vehicle is shown wherein a piston 2 is movable back and forth in a cylinder 3. The cylinder 3 is provided with a combustion chamber 4 which is, inter alia, delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 can be ignited with the spark plug 10 at a pregiven ignition time point or ignition angle.

A rotatable throttle flap 11 is mounted in the intake manifold 7 and air can be supplied via the throttle flap to the intake manifold 7. The quantity of the supplied air is dependent upon the angular position of the throttle flap 11. A catalytic converter 12 is accommodated in the exhaust-gas pipe 8 and functions for purifying the exhaust gases developed by the combustion of the fuel.

The piston 2 is set into a back-and-forth movement by the combustion of the fuel in the combustion chamber 4 and this movement is transmitted to a crankshaft (not shown) and imparts a torque to the crankshaft.

An exhaust-gas recirculation pipe 13 connects the exhaust-gas pipe 8 and the intake manifold 7. An exhaust-gas recirculation valve 14 is accommodated in the exhaust-gas recirculation pipe 13. In total, an exhaust-gas recirculation is realized in this manner.

Input signals 19 are applied to a control apparatus 18 and these signals define operating variables of the engine 1 measured by means of sensors. For example, the control apparatus 18 is connected to an air mass sensor, a lambda sensor, an rpm sensor and the like. Furthermore, the control apparatus 18 is connected to an accelerator pedal sensor which generates a signal which indicates the position of an accelerator pedal actuated by the driver and therefore the requested torque. The control apparatus 18 generates output signals 20 with which the performance of the engine 1 can be influenced via actuators or positioning devices. For example, the control apparatus 18 is connected to the injection valve 9, the spark plug 10 and the throttle flap 11 and the like and generates the signals required for driving the same.

The control apparatus 18 is provided, inter alia, to control (open loop and/or closed loop) the operating variables of the engine 1. For example, the fuel mass, which is injected by the injection valve 9 into the combustion chamber 4, is controlled (open loop and/or closed loop) by the control apparatus 18 especially with respect to a low fuel consumption and/or a low development of toxic substances. For this purpose, the control apparatus 18 is provided with a microprocessor which has a program stored in a storage medium, especially in a flash memory and this program is suitable to execute the above-mentioned control (open loop and/or closed loop).

In a first operating mode, a so-called homogeneous operation of the engine 1, the throttle flap 11 is partially opened or closed in dependence upon the torque desired. The fuel is injected by the injection valve 9 into the combustion chamber 4 during an induction phase caused by the piston 2. The injected fuel is swirled by the air, which is inducted simultaneously via the throttle flap 11, and is thereby essentially uniformly distributed in the combustion chamber 4. Thereafter, the air/fuel mixture is compressed during the compression phase in order to be ignited by the spark plug 10. The piston 2 is driven by the expansion of the ignited fuel. In homogeneous operation, the developed torque is dependent, inter alia, on the position of the throttle flap 11. With a view to a low development of toxic substances, the air/fuel mixture is adjusted as closely as possible to lambda equal to 1 or to lambda somewhat greater than one in combination with the exhaust-gas recirculation.

In a second operating mode, a so-called stratified operation of the engine 1, the throttle flap 11 is opened wide. The fuel is injected into the combustion chamber 4 by the injection valve 9 during a compression phase caused by the piston 2 and is injected locally into the immediate vicinity of the spark plug 10 as well as at a suitable interval in time ahead of the ignition time point. Then, with the aid of the spark plug 10, the fuel is ignited so that the piston 2 is driven in the following work phase by the expansion of the ignited fuel. The arising torque is substantially dependent upon the injected fuel mass in stratified operation. For the most part, the stratified operation is provided for the idle operation and the part-load operation of the engine 1.

In a third operating mode, a double injection is carried out. This defines a combination of homogeneous operation and stratified operation. Accordingly, fuel is injected into the combustion chamber 4 of the engine 1 in a first injection during the induction phase and in a second injection during the compression phase. This third operating mode serves, inter alia, to reduce the knock sensitivity of the engine 1. The third operating mode can be especially combined with the exhaust-gas recirculation in order to reduce nitrogen oxide emissions.

The knock sensitivity of the engine 1 is that much lower the leaner the air/fuel mixture is in a so-called end-gas region of the combustion chamber 4. The end-gas region is that region of the overall charge, which is disposed in the combustion chamber 4 and is not yet ignited after the ignition of the spark plug 10.

In the present case, especially the fuel injected during the compression phase is ignited by the spark plug 10 and this fuel is present as a cloud directly in the region of the spark plug 10. Only thereafter does the fuel injected during the induction phase outside of the cloud get ignited. Before the injection of the latter, this fuel, which is distributed homogeneously in the combustion chamber 4, defines, however, the above-mentioned end-gas or end-vapor region.

Figure 2:
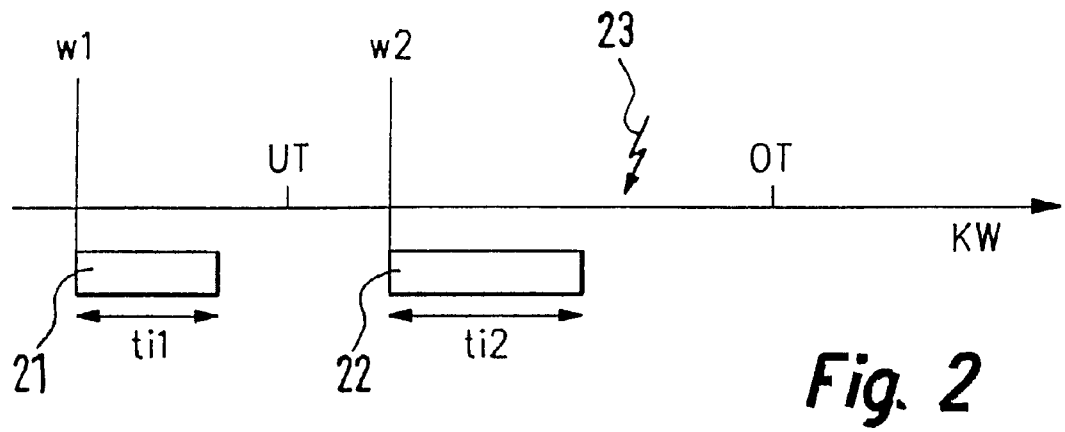
FIG. 2 shows a schematic time diagram of a first embodiment of a method according to the invention for operating the internal combustion engine of FIG. 1.

In FIG. 2, a double injection corresponding to the third operating mode is shown. Here, two injections 21 and 22 are plotted as a function of the crankshaft angle KW and therefore as a function of the time. These injections have the injection durations ti1 and ti2 and the injection start angles w1 and w2. The bottom dead center is identified by "UT" and the top dead center of the engine 1 is designated by "OT". The spark plug 10 is ignited at the arrow 23.

The first injection 21 takes place ahead of bottom dead center UT and therefore during the induction phase in homogeneous operation. The second injection 22 takes place after bottom dead center UT but ahead of top dead center OT, that is, during the compression phase and therefore in stratified operation.

The total fuel quantity or fuel mass, which is injected into the combustion chamber 4, corresponds to the total injection duration tiges, which comprises the two injection durations ti1 and ti2 according to tiges=ti1+ti2 and which is determined by the control apparatus 18 in dependence upon the operating variables of the engine 1.

If a knocking of the engine 1 is determined by the control apparatus 18, for example, by means of a knock sensor or in any other way, which knocking can, for example, arise with the use of a fuel having a low octane number, then the injection durations ti1 and ti2 are changed by the control apparatus 18 as follows:

ti1(new)=ti1(old)−dti ti2(new)=ti2(old)+dti.

The time duration dti is a time duration which is less than the injection durations ti1 and ti2. This time duration dti can be permanently pregiven by the control apparatus 18 or can be determined in dependence upon operating variables of the engine 1.

The total injection duration tiges thereby remains constant, that is, tiges(new)=tiges(old). In the first injection, however, less fuel is injected and in the second injection, more fuel is injected. This has the consequence that the air/fuel mixture, which is generated in homogeneous operation, becomes leaner because of the shorter injection duration ti1(new) and the layered fuel cloud, which is generated in stratified operation, becomes richer because of the longer injection duration ti2(new).

The air/fuel mixture in the end-gas region of the combustion chamber 4 becomes leaner because of the first injection which is becoming leaner. In this way, the knock sensitivity of the engine 1 drops.

It is, however, possible because of the second injection, which is becoming ever richer, that the layered fuel cloud, which results therefrom, becomes so rich that a pregiven limit, for example, a soot limit, is exceeded with the combustion of this fuel.

Figure 3:
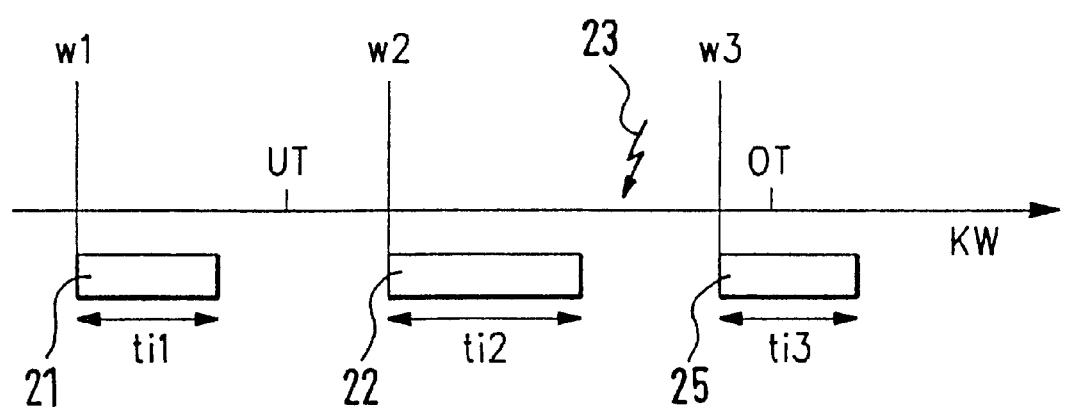
FIG. 3 shows a schematic time diagram of a second embodiment of a method according to the invention for operating the internal combustion engine of FIG. 1; and, FIG. 4 shows a schematic sequence diagram of an embodiment for executing the method of FIG. 3.

In FIG. 3, a variation of the double injection of FIG. 2 is shown, namely, a triple injection. Three injections 21, 22, 25 are plotted as a function of the crankshaft angle KW and therefore as a function of time. The injections have the injection durations ti1, ti2 and ti3 and the injection start angles w1, w2 and w3. Bottom dead center is identified by "UT" and top dead center of the engine 1 is identified by "OT". The spark plug 10 is ignited at the arrow 23.

The first injection 21 takes place ahead of bottom dead center "UT" and therefore during the induction phase in homogeneous operation. The second injection 22 takes place after bottom dead center "UT" but in advance of top dead center "OT", that is, during the compression phase and therefore in stratified operation. The third injection 25 takes place after the ignition by the spark plug at time point 23 and approximately in the time region or crankshaft angle region during which the crankshaft runs through top dead center "OT". The third injection 25 therefore takes place after the ignition and therefore during the running combustion.

The total fuel quantity or fuel mass, which is injected into the combustion chamber 4, corresponds to the total injection duration tiges which is composed of the three injection durations ti1, ti2 and ti3 according to tiges=ti1+ti2+ti3 and is determined in dependence upon the operating variables of the engine 1 via the control apparatus 18.

If a knocking of the engine 1 is determined by the control apparatus 18, for example, by means of a knock sensor or in any other way, then the injection durations ti1 and ti3 are changed as follows by the control apparatus 18:

ti1(new)=ti1(old)−dti ti3(new)=ti3(old)+dti.

The injection duration ti2 is, however, not changed because of reasons of simplification:

ti2(new)=ti2(old).

The time duration dti is a time duration which is less than the injection durations ti1, ti2 and ti3 and this time duration dti is permanently pregiven by the control apparatus 18 or can be determined in dependence upon operating variables of the engine 1.

The total injection duration tiges thereby remains constant, that is, tiges(new)=tiges(old). In the first injection, however, less fuel is injected and, in the third injection, more fuel is injected. The second injection remains unchanged. This has the consequences that: the air/fuel mixture, which is generated in homogeneous operation, becomes leaner because of the shorter injection duration ti1(new); the layered fuel cloud, which is generated in stratified operation remains unchanged; and, the third injection becomes richer.

Because the first injection is becoming ever leaner, the air/fuel mixture in the end-gas region of the combustion chamber 4 also becomes leaner. Therefore, the knock sensitivity of the engine 1 drops.

The stratified operation does not become richer and the layered fuel cloud, which results therefrom, remains the same because of the unchanged second injection. With the combustion of this fuel, a pregiven soot limit can be considered without the danger that this soot limit is exceeded.

In an extreme case, it is possible to adjust the injection duration ti1 to zero. This means that the first injection 21 is no longer present. In this way, the knock sensitivity of the engine 1 can be further reduced.

In another extreme case, it is possible that the injection end of the injection 22 is equal to the ignition time point 23 and also equal to the injection start of the injection 25.

Figure 4:
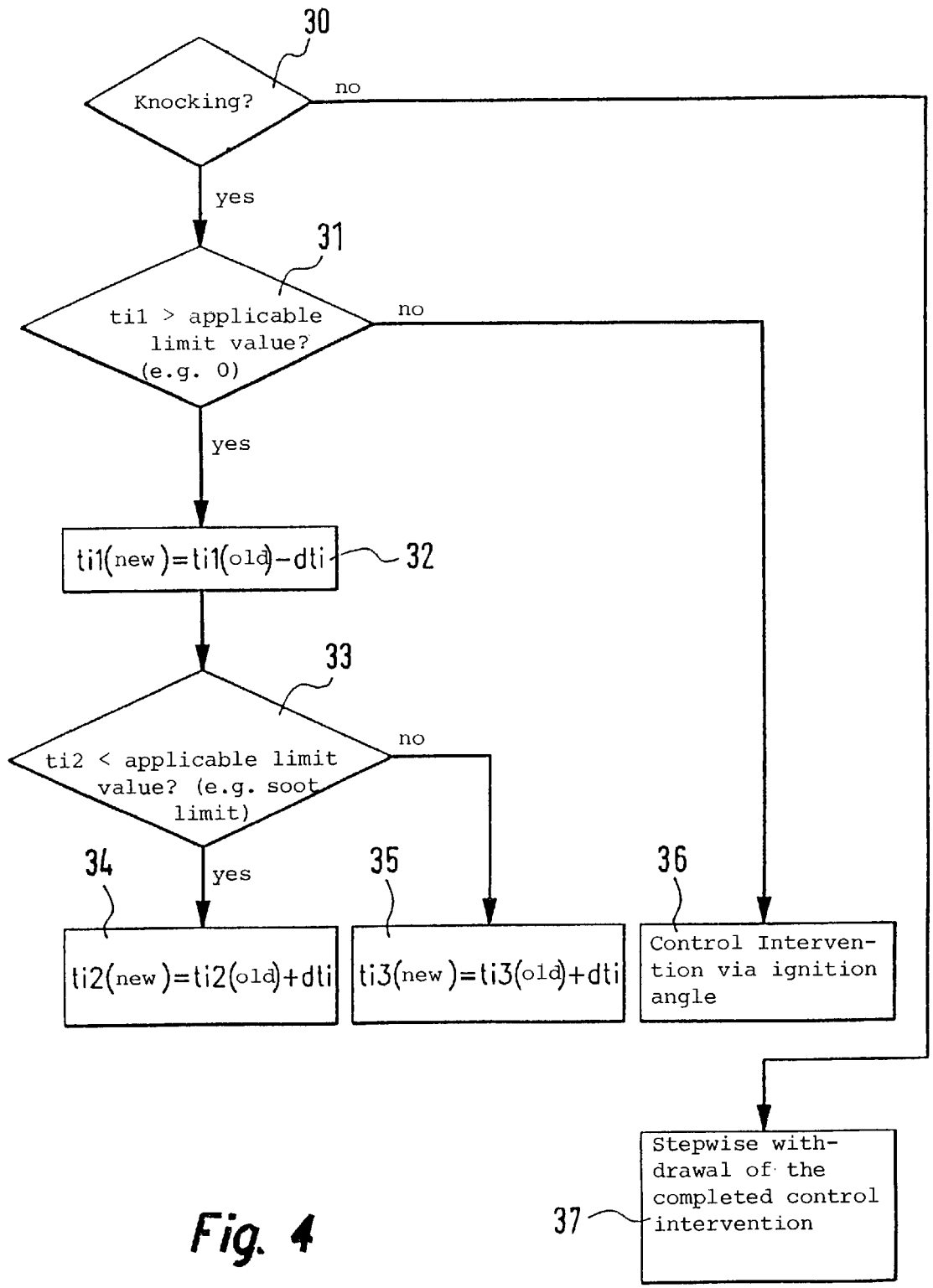

In FIG. 4, a method is shown with which the triple injection, which is explained with respect to FIG. 3, is carried out by the control apparatus 18.

In block 30, the control apparatus 18 determines whether a knocking is present in the engine 1, for example, by means of a knock sensor or in some other manner. In block 31, a check is made by the control apparatus 18 as to whether the injection duration ti1 is still greater than a pregiven possibly applicable limit value. In the extreme case, this limit value can also be zero as already explained. If the injection duration ti1 is greater than the limit value, then, in block 32, the injection duration ti1 is shortened by the time duration dti corresponding to the already-mentioned equation ti1(new)=ti1(old)−dti.

In a following block 33, a check is made by the control apparatus 18 as to whether the injection duration ti2 is still less than a pregiven possibly applicable limit value. This limit value can, for example, be dependent upon the already-mentioned soot limit. If the injection duration ti2 is less than the limit value, then, in block 34, the injection duration ti2 is lengthened by the time duration dti corresponding to the already-mentioned equation ti2(new)=ti2(old)+dti.

If the injection duration ti2 is, however, already greater than the above-mentioned limit value, then block 34 is not executed and the injection duration ti2 is thereby not lengthened but instead retained. In lieu thereof, the injection duration ti3 is lengthened by the time duration dti in block 35 in correspondence to the already-mentioned equation ti3(new)=ti3(old)+dti.

In total, it is achieved in this manner that, on the one hand, the first injection duration ti1 is shortened and thereby the knock sensitivity of the engine 1 is reduced, while, on the other hand, the injection duration ti2 is not increased beyond the limit value and thereby the soot limit is maintained.

If it is determined by the control apparatus 18 in block 31 that the injection duration ti1 is already less than the pregiven limit value, then a further reduction of the knock sensitivity can no longer be attained via a shortening of the injection duration ti1. In this case, in a block 36, the ignition angle, that is, the time point 23 of the ignition of the spark plug 10 is so controlled (open loop and/or closed loop) that the knock sensitivity is reduced in this way. The ignition angle is especially retarded.

If it is determined by the control apparatus 18 in block 30 that knocking of the engine 1 is no longer present, then the executed changes of the injection durations ti1, ti2, ti3 can again be withdrawn in block 37 in a stepwise manner. Here, a check can first be made as to whether the withdrawal is purposeful or whether it is more practical to undertake any kind of adaptation on the control (open loop and/or closed loop) of the engine 1 and/or on the method of FIG. 4. This decision can, for example, be made with the aid of a comparison of efficiencies of the engine 1 before and after the executed changes of the injection durations ti1, ti2, ti3.

What is claimed is:

1. A method for operating an internal combustion engine including an engine of a motor vehicle, the method comprising the steps of:
    injecting fuel via an injection valve directly into a combustion chamber of said engine in a first mode of operation during an induction phase;
    injecting fuel via said injection valve directly into said combustion chamber in a second mode of operation during a compression phase; or,
    injecting a mass of fuel via said injection valve directly into said combustion chamber of said engine in a third operating mode during the induction and compression phases and igniting said mass of fuel via a spark plug; and,
    in said third operating mode, reducing the mass of fuel injected during the induction phase thereof in response to a knocking of said engine and increasing the mass of fuel injected during the compression phase in the same way as the mass of fuel injected during the induction phase is reduced.

2. The method of claim 1, wherein: in the third operating mode, fuel is injected directly from the injection valve into the combustion chamber after the ignition by the spark plug.

3. The method of claim 2, wherein the mass of the fuel, which is injected after the ignition, is increased in the same manner as the mass of the fuel, which is injected during the induction phase, is reduced.

4. The method of claim 3, wherein the mass of the fuel, which is injected during the compression phase, is maintained at a value which is less than a pregivable or applicable limit.

5. The method of claim 1, wherein the ignition angle is retarded.

6. A method for operating an internal combustion engine including an engine of a motor vehicle, the method comprising the steps of:
    injecting a mass of fuel via an injection valve directly into the combustion chamber of said engine during an induction phase and a compression phase and igniting said mass of fuel with a spark plug; and,
    reducing said mass of fuel injected during said induction phase in response to a knocking of said engine and increasing the mass of fuel injected during the compression phase in the same way as the mass of fuel injected during the induction phase is reduced.

7. A control element including a flash memory, for a control apparatus of an internal combustion engine including an engine of a motor vehicle, said control element comprising: a program stored on said control element which can run on a computer including a microprocessor, and said program being configured to carry out the method steps of:
    injecting fuel via an injection valve directly into a combustion chamber of said engine in a first mode of operation during an induction phase;
    injecting fuel via said injection valve directly into said combustion chamber in a second mode of operation during a compression phase; or,
    injecting a mass of fuel via said injection valve directly into said combustion chamber of said engine in a third operating mode during the induction and compression phases and igniting said mass of fuel via a spark plug; and,
    in said third operating mode, reducing the mass of fuel injected during the induction phase thereof in response to a knocking of said engine and increasing the mass of fuel injected during the compression phase in the same way as the mass of fuel injected during the induction phase is reduced.

8. A control element, including a flash memory, for a control apparatus of an internal combustion engine including an engine of a motor vehicle, said control element comprising: a program stored on said control element which can be run on a computer including a microprocessor, and said program being configured to carry out the method steps of:
    injecting a mass of fuel via an injection valve directly into the combustion chamber of said engine during an induction phase and a compression phase and igniting said mass of fuel with a spark plug; and, reducing said mass of fuel injected during said induction phase in response to a knocking of said engine and increasing the mass of fuel injected during the compression phase in the same way as the mass of fuel injected during the induction phase is reduced.

9. A control apparatus for an internal combustion engine including an engine of a motor vehicle, the engine having a combustion chamber into which fuel can be injected directly from an injection valve and be ignited by a spark plug in a first operating mode during an induction phase, in a second operating mode during a compression phase, or in a third operating mode during an induction phase and a compression phase, said control apparatus comprising: means for reducing the mass of fuel injected in said third operating mode during said induction phase in response to a knocking of said engine and for increasing the mass of fuel injected during the compression phase in the same way as the mass of fuel injected during the induction phase is reduced.

10. An internal combustion engine including an engine of a motor vehicle, the engine comprising:
    a combustion chamber wherein fuel is injected directly from an injection valve and ignited by a spark plug in a first operating mode during an induction phase, in a second operating mode during a compression phase and in a third operating mode during an induction phase and during a compression phase; and,
    a control apparatus for reducing the mass of fuel injected in said third operating mode during said induction phase in response to a knocking of said engine and for increasing the mass of fuel injected during the compression phase in the same way as the mass of fuel injected during the induction phase is reduced.

11. An internal combustion engine including an engine of a motor vehicle, the engine comprising:
    a control apparatus for controlling the mass of fuel injected directly into said combustion chamber during an induction phase and during a compression phase; and,
    said control apparatus including means for reducing the mass of fuel injected in said third operating mode during said induction phase in response to a knocking of said engine and for increasing the mass of fuel injected during the compression phase in the same way as the mass of fuel injected during the induction phase is reduced.

12. The internal combustion engine of claim 11, wherein the control provided by said control apparatus is at least one of an open-loop control and a closed-loop control.

* * * * *